US009845409B2

(12) United States Patent
Dressick et al.

(10) Patent No.: US 9,845,409 B2
(45) Date of Patent: Dec. 19, 2017

(54) HYDROPHOBIC NANOSTRUCTURED THIN FILMS

(71) Applicant: The United States of America, as represented by the Secretary of the Navy, Washington, DC (US)

(72) Inventors: Walter J. Dressick, Waldorf, MD (US); Melik C. Demirel, State College, PA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 15/219,925

(22) Filed: Jul. 26, 2016

(65) Prior Publication Data
US 2017/0029659 A1 Feb. 2, 2017

Related U.S. Application Data

(62) Division of application No. 14/018,507, filed on Sep. 5, 2013, now Pat. No. 9,422,448, which is a division
(Continued)

(51) Int. Cl.
*B32B 27/00* (2006.01)
*C09D 155/00* (2006.01)
(Continued)

(52) U.S. Cl.
CPC .............. *C09D 165/04* (2013.01); *B05D 1/38* (2013.01); *B05D 1/60* (2013.01); *C08F 283/004* (2013.01);
(Continued)

(58) Field of Classification Search
USPC ......... 428/411.1; 427/255.6, 430.1; 528/220; 526/242
See application file for complete search history.

(56) References Cited

U.S. PATENT DOCUMENTS 4,828,911 A * 5/1989 Morman ................. A61L 15/60
156/62.4
8,535,805 B2 * 9/2013 Demirel ................... B05D 1/38
427/255.6
(Continued)

FOREIGN PATENT DOCUMENTS

WO WO-2005/108460 A1 * 11/2005
WO WO-2010/126483 A1 * 11/2010

OTHER PUBLICATIONS

Boduroglu et al., "Controlling the Wettability and Adhesion of Nanostructured Poly-(p-xylene) Films" Langmuir, 2007, 23, 11391-11395.*
(Continued)

*Primary Examiner* — Mark Kaucher
*Assistant Examiner* — Henry Hu
(74) *Attorney, Agent, or Firm* — US Naval Research Laboratory; Joseph T. Grunkemeyer

(57) ABSTRACT

Provided herein are the polymers shown below. The value n is a positive integer. $R^1$ is an organic group, and each $R^2$ is H or a chemisorbed group, with at least one $R^2$ being a chemisorbed group. The polymer may be a nanostructured film. Also provided herein is a method of: converting a di-p-xylylene paracyclophane dimer to a reactive vapor of monomers; depositing the reactive vapor onto a substrate held at an angle relative to the vapor flux to form nanostructured poly(p-xylylene) film; reacting the film with an agent to form hydrogen atoms that are reactive with a precursor of a chemisorbed group, if the film does not contain the hydrogen atoms; and reacting the hydrogen atoms with the precursor. Also provided herein is a device having a nanostructured poly(p-xylylene) film on a pivotable substrate. The film has directional hydrophobic or oleophobic properties and directional adhesive properties.

(Continued)

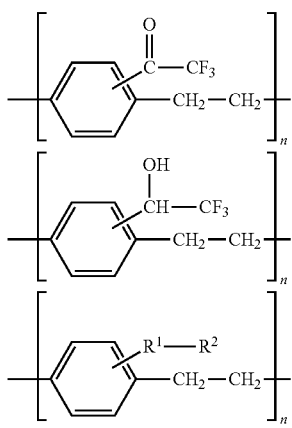

8 Claims, 6 Drawing Sheets

Related U.S. Application Data of application No. 12/430,932, filed on Apr. 28, 2009, now Pat. No. 8,535,805.

(60) Provisional application No. 61/048,475, filed on Apr. 28, 2008.

(51) Int. Cl.
  C09D 165/04 (2006.01)
  B05D 1/38 (2006.01)
  B05D 1/00 (2006.01)
  C08G 61/02 (2006.01)
  C09J 7/00 (2006.01)
  C08F 283/00 (2006.01)
  C08G 81/00 (2006.01)
  B05D 5/08 (2006.01)
  B05D 5/10 (2006.01)

(52) U.S. Cl.
  CPC ........... *C08G 61/025* (2013.01); *C08G 81/00* (2013.01); *C09D 155/00* (2013.01); *C09J 7/00* (2013.01); *B05D 5/08* (2013.01); *B05D 5/10* (2013.01); *C08G 2261/3424* (2013.01); *C08G 2261/61* (2013.01); *C09J 2201/626* (2013.01); *Y10T 428/2835* (2015.01); *Y10T 428/31504* (2015.04)

(56) References Cited

U.S. PATENT DOCUMENTS

| 9,422,448 B2* | 8/2016 | Dressick | B05D 1/38 |
| 2004/0110276 A1* | 6/2004 | Amontov | B82Y 30/00 435/287.2 |
| 2006/0057180 A1* | 3/2006 | Chilkoti | A61L 27/34 424/422 |
| 2006/0169399 A1* | 8/2006 | Kronzer | B41M 5/0256 156/235 |
| 2006/0286682 A1* | 12/2006 | Amontov | B82Y 30/00 436/518 |

OTHER PUBLICATIONS

Lahann et al., "Novel Poly(p-xylylenes): Thin Films with Tailored Chemical and Optical Properties" Macromolecules, 2002, 35, 4380-4386.*
Demirel et al., "Noncovalent Deposition of Nanoporous Ni Membranes on Spatially Organized Poly(p-xylylene) Film Templates" Adv. Mater., 2007, 19, 4495-4499.*

* cited by examiner

HYDROPHOBIC NANOSTRUCTURED THIN FILMS

This application is a divisional application of U.S. Pat. No. 9,422,448, issued on Aug. 23, 2016, which is a divisional application of U.S. Pat. No. 8,535,805, issued on Sep. 17, 2013, which claims the benefit of U.S. Provisional Patent Application No. 61/048,475, filed on Apr. 28, 2008. The provisional application, all publications referenced therein, and all other publications and patent documents referenced throughout this nonprovisional application are incorporated herein by reference.

TECHNICAL FIELD

The disclosure is generally related to hydrophobic nanostructured thin films.

DESCRIPTION OF RELATED ART

Hydrophobicity and adhesive properties of nanostructured surfaces are important for many practical applications, such as the handling of small liquid droplets, inducing selective permeability in a membrane, and the operation of wall-climbing robots. The methods of preparing superhydrophobic and adhesive surfaces include chemical etching and template-based techniques. However, the simultaneous control of both wettability and adhesion properties of superhydrophobic surfaces has not been studied in detail.

[2.2]Paracyclophane was first prepared in 1949 by Brown and Farthing (Brown et al., Nature 1949, 164, 915-916) and systematically investigated by Cram and co-workers from 1951 onward (Cram et al., J. Am. Chem. Soc. 1951, 73, 5691-5704). Chemically, [2.2]paracyclophane is a dimmer of two p-xylylene groups (a layered π system) that have an unusual 3D aromatic structure compared to that of the planar benzene ring. Applications of [2.2]paracyclophane include molecular machines realized through supramolecular assembly (Anelli et al., Angew. Chem., Int. Ed. Engl. 1991, 30, 1036-1039) and polymeric thin films (poly(p-xylylene)) of cyclophanes for biomedical purposes (Gorham, J. Polym. Sci., Part A: Polym. Chem. 1966, 4, 3027-3036).

Only a few examples of nanostructured PPX films have been described in the literature, including PPX polymer brushes (Lahann et al., Macromol. Rapid Commun. 2001, 22, 968-971) and template PPX fibers (Bognitzki et al., Adv. Mater. 2000, 12, 637-640).

Nanoporous films have generated great interest due to their unusual physical and chemical properties arising from their high surface area and their nanoscale dimension. One important property is controlling the hydrophobicity of surfaces for antifouling and biomedical applications. Examples of nanostructured materials for tuning the hydrophobicity have been shown for self cleaning, anti-sticking and anti-contamination. The methods of preparing and tuning hydrophobic surfaces are template based techniques, plasma treatment, chemical deposition, layer-by-layer deposition and colloidal assembly. However, all these methods are either costly or difficult to prepare at an industrial scale. Halogen derivatives of PPX are hydrophobic and used in variety of applications, such as in the automotive, medical, electronics, and semiconductor industries. They are known for their gas phase chemical vapor deposition and conformal coating (pinhole-free) at room temperature.

Superhydrophobic surfaces (water contact angle $\theta_w > 150°$) have been widely studied to develop materials with unique properties such as self-cleaning and/or antifouling behavior (Feng et al., Adv. Mater. 2006, 18, 3063-3078; Sun et al., Acc. Chem. Res. 2005, 38, 644-652). Normally, superhydrophobic surfaces have higher contact angles and very low water droplet roll-off angles) (<5°. A new class of superhydrophobic but adhesive surfaces has been recently reported (Guo et al., Appl. Phys. Lett. 2007, 90, article no. 223111; Hong et al., J. Am. Chem. Soc. 2007, 129, 1478-1479; Jin et al., Adv. Mater. 2005, 17, 1977-1981). These surfaces are prepared either by surface etching or by microscopic structures of hydrophobic materials. Although these nanostructured surfaces have high water contact angles ($\theta_w > 150°$), a water drop adheres to a surface even if the surface is tilted upside down (i.e., 180°). This strong adhesion has been attributed to van der Waals and/or the capillary force interactions between the nanostructured film surface and water. Similarly, biological structures built using molecular protein machinery in nature also show superhydrophobic and adhesive surface features. For example, the attractive forces that hold geckos to surfaces are van der Waals interactions between the finely divided keratinous fibers ($\sim 5 \times 10^5$ on each foot) and the surfaces themselves (Huber et al., Proc. Natl. Acad. Sci. U.S.A. 2005, 102, 16293-16296; Autumn et al., Proc. Natl. Acad. Sci. U.S.A. 2002, 99, 12252-12256; Ruibal et al., J. Morphol. 1965, 117, 271-293).

BRIEF SUMMARY

Disclosed herein is a polymer comprising the repeat unit shown in formula (1), wherein n is a positive integer. The polymer is a nanostructured film made by: converting a trifluoroacetyl-di-p-xylylene paracyclophane dimer to a reactive vapor of monomers, the reactive vapor having a flux, and depositing the reactive vapor under vacuum onto a substrate held fixed in a specific angle of orientation relative to the vapor flux to form nanostructured poly(trifluoroacetyl-p-xylylene) (PPX-COCF$_3$) film.

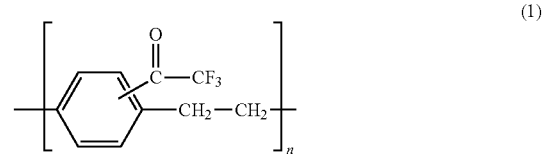

(1)

Also disclosed herein is a polymer comprising the repeat unit shown in formula (2), designated PPX-COHCF$_3$, wherein n is a positive integer.

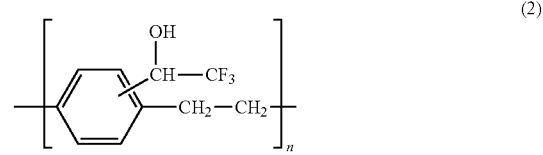

(2)

Also disclosed herein is a polymer comprising the repeat unit shown in formula (3), wherein n is a positive integer, $R^1$ is an organic group, and each $R^2$ is H or a chemisorbed group. The polymer comprises at least one chemisorbed group. All these polymers may also be represented by the general structure shown in formula (4), where $R_a$ and $R_b$ are hydrogen or an organic group. A suitable range of values for n is 5 to 10,000.

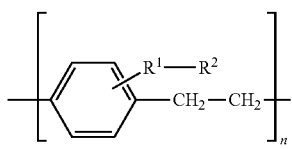

(3)

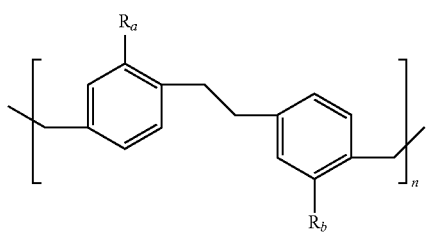

(4)

Also disclosed herein is a method comprising: converting a di-p-xylylene paracyclophane dimer to a reactive vapor of monomers, the reactive vapor having a flux; depositing the reactive vapor under vacuum onto a substrate held fixed in a specific angle of orientation relative to the vapor flux to form nanostructured poly(p-xylylene) film; reacting the nanostructured poly(p-xylylene) film with an agent to form hydrogen atoms attached to the poly(p-xylylene) film that are reactive with a precursor of a chemisorbed group, if the deposited film does not contain the hydrogen atoms; and reacting the hydrogen atoms with the precursor of the chemisorbed group.

Also disclosed herein is a device comprising a nanostructured poly(p-xylylene) film on a pivotable substrate. The film has directional hydrophobic or oleophobic properties and directional adhesive properties.

BRIEF DESCRIPTION OF THE DRAWINGS

A more complete appreciation of the invention will be readily obtained by reference to the following Description of the Example Embodiments and the accompanying drawings.

FIG. 1A: 8.1 nm, FIG. 1B: 37.6 nm and FIG. 1C: 77.5 nm. (Scale bars for the AFM scans: X:1 µm/div, Y:1 µm/div, Z:100 nm/div).

DETAILED DESCRIPTION OF EXAMPLE EMBODIMENTS

Figure 1A:
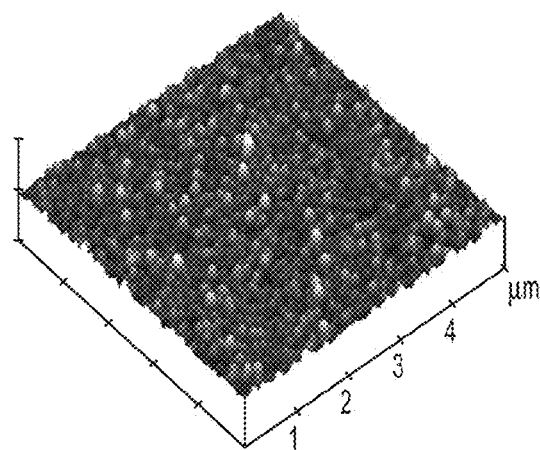
FIGS. 1A-C shows surface AFM scans for structured poly(chloro-p-xylylene) (PPX-Cl) films. Surface roughnesses are

In the following description, for purposes of explanation and not limitation, specific details are set forth in order to provide a thorough understanding of the present disclosure. However, it will be apparent to one skilled in the art that the present subject matter may be practiced in other embodiments that depart from these specific details. In other instances, detailed descriptions of well-known methods and devices are omitted so as to not obscure the present disclosure with unnecessary detail.

The present disclosure relates generally to materials and methods for controlling adhesion of nanostructured thin films. The present disclosure further relates to tuning the adhesion of hydrophobic nanostructured poly(p-xylylene) ("PPX") surfaces. The present disclosure further relates to a method of depositing a nanostructured PPX thin film exhibiting tunable, controlled liquid wettability and adhesion properties via the oblique angle vapor deposition and subsequent polymerization of a paracyclophane precursor onto a substrate surface. A method and system for forming and using the PPX films is described and set forth in U.S. Patent Application Publication No. 2007/0148206.

The hydrophobic surface properties and controlled topography of structured PPX films, as measured by water wettability, are determined by various factors, including surface chemistry, film composition, and surface roughness. Disclosed herein is the fabrication of very hydrophobic surfaces and control over adhesion properties via nanoscale modulation of roughness, changes in composition, and alteration of the surface chemistry of PPX films. The formation of superhydrophobic surfaces through the chemisorption of fluoroalkylsiloxane coatings to hydroxyl sites created on the nanostructured PPX surface is also illustrated. The ability to control both hydrophobicity and adhesion using nanostructured PPX films may lead to a new generation of coatings with applicability ranging from self-cleaning surfaces to robotics.

Films may be made by a bottom-up process based on oblique angle deposition as a simple, robust method for controlling the morphology of PPX films (Cetinkaya et al., i Polymer 2007, 48, 4130-4134; Demirel, M. C.; Boduroglu et al., A. Langmuir 2007, 23, 5861-5863; Demirel et al., J. Biomed. Mater. Res. Part B 2007, 81, 219-223; U.S. Patent Application Publication Nos. 2007/0148206 and 2008/0268226). In this process, monomer vapors produced by the pyrolysis of chemically functionalized [2.2]paracyclophane precursors are directed at an oblique angle toward a surface to initiate PPX growth. Inclined deposition induces the isotropic growth of PPX nanofibers as a result of high surface diffusion and geometric shadowing effects, leading to a nanostructured PPX film comprising clusters of ~50-200 nm diameter nanocolumns. This approach allows tuning of the chemical properties of the nanostructured PPX surface (via the judicious choice of the functionalized paracyclophane precursor) and film morphology (via control of the film deposition conditions) to control the physicochemical properties of the resulting PPX films, such as hydrophobicity, porosity, and crystallinity.

Disclosed herein is the control of adhesive properties of several hydrophobic PPX films deposited by the oblique angle method. Also disclosed are multiple ways of tuning the hydrophobicity of the structured PPX surfaces. This method allows a change not only in the surface roughness but also in the surface chemistry of the material. Also disclosed is the fabrication of superhydrophobic films through the chemisorption of fluoroalkylsiloxane coatings to hydroxyl sites created on the PPX film surface and the control of both water wettability and adhesion through appropriate choices of PPX surface chemistry and roughness. The ability to simultaneously control surface chemistry and film morphology shown here makes these nanostructured PPX films potential candidates for use in antifouling and biomedical applications.

Thin films of poly(chloro-p-xylylene) (PPX-Cl) grown by the pyrolysis and evaporation of dichloro-[2.2]paracyclophane in an evacuated chamber contain free-standing, slanted, parallel columns that are 50 µm long and are assemblies of 50- to 100- to 150-nm-diameter nanowires, which thus can have an aspect ratio as high as 1000:1. The nanostructured thin films organize spatially with a chemical structure similar to that of planar PPX-Cl thin films, but the former also possess nanostructured morphology. Nanostructured thin films of PPX and its derivatives may be useful as functionalized interfaces for antifouling coatings and biomedical devices. The production technique does not require any mask, lithography method, or surfactant for deposition.

The nanostructured PPX thin films may have two advantages over planar (flat) PPX thin films. First, the nanostructure enhances the surface area, thereby increasing the efficiency of functionalization. Second, novel chemical properties can be obtained by the co-deposition of two or more types of PPX monomers with different side groups, which can be esters, ketones, amines, lactones, and so forth.

PPX film chemistry is a parameter for tuning the hydrophobicity of nanostructured films. Three PPX nanostructured columnar thin films, poly(bromo-p-xylylene) (PPX-Br) and poly(o-trifluoroacetyl-p-xylylene-co-p-xylylene) (PPX-COCF$_3$) and poly(chloro-p-xylene) (PPX-Cl), were deposited obliquely on glass substrates at an angle $\alpha$ (=10°). Microscopic features of films from three different substrates appear to have close similarity.

Superhydrophic surfaces of PPX may be created by changing the surface chemistry or surface roughness. The hydrophobicity of the PPX film may increase as the film become more electronegative and the surface roughness increases. The nanostructured PPX columnar thin films may be utilized in antifouling and biomedical applications by controlling surface topology, chemistry and film morphology at the same time.

PPX thin films have a wide range of usage such as chemical and corrosion resistant coatings, capacitor dielectrics, moisture barriers, electrical insulators and dry lubricants, anti-friction layers in MEMS. Nanostructured PPX coatings may improve surface properties of traditionally coated medical devices by providing superhydrophobic and self-decontaminated surfaces. Potential advantages of nanostructured PPX as biomedical coatings include:
  (i) Their chemistry and porosity are controllable, and so it is possible to engineer not only the surface properties of STFs but also 3-dimensional scaffolds;
  (ii) They can be made out of many FDA-approved polymeric materials and can be endowed with transverse architectures to provide the best possible substrate and coating material for biomedical devices.

As used herein, the following terms have the meanings shown.

Nanostructured—having structures of dimensional size between molecular and microscopic PPX or parylene—poly-(p-xylylene)

Organic—containing at least carbon and hydrogen atoms, and optionally oxygen atoms Chemisorbed—adsorption involving a chemical (e.g. covalent) linkage between adsorbent and adsorbate. The chemisorption may be limited to the surfaces of a film, including a nanostructured film. The chemisorption may also partially or fully penetrate the film.

Functionalized—altered on the chemical level, in particular by adding one or more chemical substituents to a polymer (for example a PPX polymer) backbone, for example, ester, amine, ketone, lactone, halogen, hydroxyl, acetyl, etc., where Silane—$Si(R)_{4-n}(X)_n$ wherein R is hydrogen or unsubstituted or substituted alkyl or aryl and X is halogen or alkoxide and n is a positive integer from 1-3.

Rough Surface—one specific possible type of nanostructured thin film topographic morphology Nanocolumns—approximately parallel aligned straight wire structures of PPX having individual column wire diameters less than about 250 nm. They are formed by the oblique angle deposition method whereby a flux of pyrolyzed para-[2.2]cyclophanes precursor vapor impinges on a non-rotating planar substrate surface to be coated with the nanostructured PPX film at an angle $\alpha$ with respect to the substrate surface plane, where $0°<\alpha<90°$ and $\alpha$ is most preferably $10°<\alpha<30°$.

Nanohelices—approximately parallel aligned helical wire structures of PPX having individual wire diameters of less than about 250 nm. They are formed as described for nanocolumns with deposition occurring on a planar substrate rotating about an axis defined by the normal to the substrate surface at a constant angular velocity such that the vapor flux impingement angle $\alpha$ is unchanged during the deposition process.

Nanochevrons—approximately parallel aligned zigzag wire structures of PPX having individual wire diameters of about 250 nm or less. They are formed as described for nanocolumns by initial vapor flux deposition at angle $\alpha$ for a fixed time, t. At time=t the planar substrate is rotated 180° about the normal to its surface and fixed in its new position. Vapor flux deposition is continued, at angle $\alpha$ with respect to the substrate surface plane, for an additional time interval, t. The cycle of deposition for fixed time, t, followed by 180° rotation is continued until a film of desired thickness is formed.

Channels—interstitial regions between individual spaced nanostructures on a nanostructured thin film surface nm—nanometer Contact angle—the angle formed between a water droplet and a solid state surface. Measurements here typically refer to the sessile water drop contact angle, which is the contact angle a water drop quietly resting a substrate held parallel to the ground makes with the surface of that substrate.

Roll-off angle—This is the minimum angle to which a planar substrate bearing a water droplet on its surface and held parallel to the ground must be tilted for the water droplet to roll off or slide off the substrate surface. This angle is also sometimes called the sliding angle.

LAH—lithium aluminum hydride or $LiAlH_4$

THF—tetrahydrofuran (Organo)siloxane or siloxane—$Si(R)_{4-n}(O)_n$ wherein n is an integer from 1-3 and R is an optionally substituted alkyl or aryl group or H As used herein, a hydrophobic substituent group is a group such that, when the paracyclophane vapor is deposited as a flat non-nanostructured thin film, yields a parylene flat surface having a sessile water drop contact angle greater than ~70 degrees. A hydrophilic substituent will therefore have a contact angle less than ~70 degrees for water.

Figure 5:
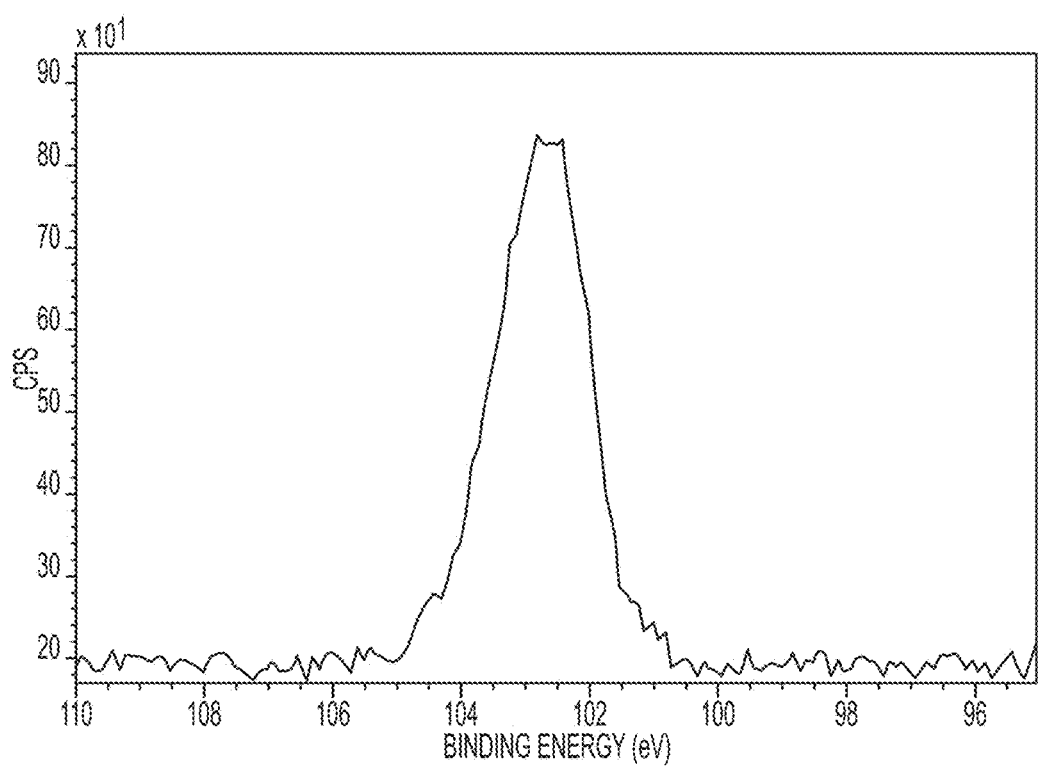
FIG. 5 shows X-ray photoelectron spectroscopy (XPS) analysis of heptadecafluoro-1,1,2,2-tetrahydrodecyltrichlorosilane chemisorbed on nanostructured PPX-COHCF$_3$ film. Si(2p) spectrum shows the chemisorption of the silane on the film. XPS data were acquired using an Axis Ultra XPS system (Kratos) with a monochromatic Al Kα X-ray source, 20 eV pass energy (700 µm×300 µm hybrid sample spot size), and 90° take-off angle under high vacuum conditions ($10^{-9}$ Torr).

The nanostructured PPX thin films disclosed herein are deposited on a stationary substrate where polymerization occurs on the substrate, from a directional vapor source in an evacuated chamber. [2.2]Paracyclophane derivatives are first converted to a reactive vapor of monomers of p-xylylene by pyrolysis. The substrate is oriented obliquely relative to the vapor flux, typically at an angle $\alpha \sim 10°$ in FIG. 5, which creates a porous, low-density thin film of columns inclined at an angle of $\phi > \alpha$. Without limiting the present subject matter to any particular theory, the growth of nanoporous columnar thin films may be governed by three mechanisms: (i) geometrical self-shadowing, (ii) surface diffusion along the substrate of incoming adatoms constituting the vapor, and (iii) bulk diffusion leading to oriented crystallization (Lakhtakia et al., *Sculptured Thin Films: Nanoengineered Morphology and Optics*; SPIE Press: Bellingham, Wash., 2005). Such thin films of metals, semiconductors, and a few organic dielectrics have been deposited by oblique-angle vapor deposition methods (Lakhtakia, Id.; Tsoi et al., *Langmuir* 2004, 20, 10771-10774). Similar thin films of polymers have been grown by an oblique-angle molecular beam deposition method (Cai et al., *Adv. Mater.* 1999, 11, 745-749) on the atomistic length scale but not on larger length scales. The formation of the nanostructured PPX thin films may have been influenced by a combination of nucleation (common in thin films (Petrov et al., *J. Vac. Sci. Technol., A* 2003, 21, S117-S128; Demirel et al., *Phys. Rev. Lett.* 2003, 90, 016106)) with bond formation (i.e., polymerization), in addition to the aforementioned three mechanisms.

Wettability measurements using various solvents have long been used as a means to estimate a material's surface energy and understand surface energy variations with changes in the material's chemistry, composition, and morphology. In particular, the contact angle formed by a sessile water droplet ($\theta_w$) resting on a substrate surface provides a convenient means to assess the relative hydrophobicity of that surface. The value of $\theta_w$ is known to depend on both the chemical composition and the roughness of the surface, as described previously by Cassie and Wenzel, respectively (Wenzel, *Ind. Eng. Chem.* 1936, 28, 988-994; Cassie et al., *Trans. Faraday Soc.* 1944, 40, 0546-0550). Nanostructured PPX films, as described here, offer the opportunity to vary both surface chemistry and roughness simultaneously and precisely as a means to control the hydrophobicity and adhesive properties of such films. Three parameters can influence the hydrophobicity and adhesion of PPX films: (i) film roughness, (ii) chemical composition of the film, and (iii) direct chemical modification of the film surface.

On a nanostructured surface, there are three wetting states. As used herein "wettability" refers to surface wetting by water or other liquids such as oils. A water drop can fully penetrate into the nanostructures, which is known as the Wenzel state, or the liquid can be suspended on the nanostructures, which is known as the Cassie-Baxter state. The third state is an intermediate state between the Wenzel and Cassie modes. When the wetting behavior changes from the Cassie mode to the Wenzel mode, the liquid droplet will at least partially fill the grooves of the rough substrate with a decrease in the apparent contact angle. Consequently, adhesive forces between the surface and water droplet play a key role in the third state.

To better understand the range of conditions that characterize PPX wetting behavior in these three states, the effects of film roughness on $\theta_w$ using poly(chloro-p-xylylene) (PPX-Cl) films of various thicknesses was investigated. $\theta_w$ (97.9°, 103.9°, and 111.2°) was measured as a function of surface roughness (8.1, 37.6, and 77.5 nm, respectively). The increase in surface roughness as the film becomes thicker is inherent to oblique angle deposition techniques. The surface hydrophobicity increases (i.e., water wettability decreases) as a function of surface roughness as expected, but the data do not obey the Wenzel or Cassie-Baxter equation. For example, Wenzel behavior is described by Eq. (1), where r is the measured surface roughness factor and $\theta_w^P$ is the contact angle on a planar PPX-Cl surface (i.e., 87°, see Table 1):

$$\cos \theta_w = r \cos \theta_w^P \qquad \text{Eq. (1)}$$

Eq. (1) predicts $\theta_w$ values of 86.5, 84.7, and 82.5° as the roughness increases. Similarly, Cassie-Baxter behavior is governed by Eq. (2), where f is the fraction of the water droplet in direct contact with the substrate (i.e., not suspended over air) on the rough surface:

$$\cos \theta_w = f(1 + \cos \theta_w^P) - 1 \qquad \text{Eq. (2)}$$

Figure 1B:
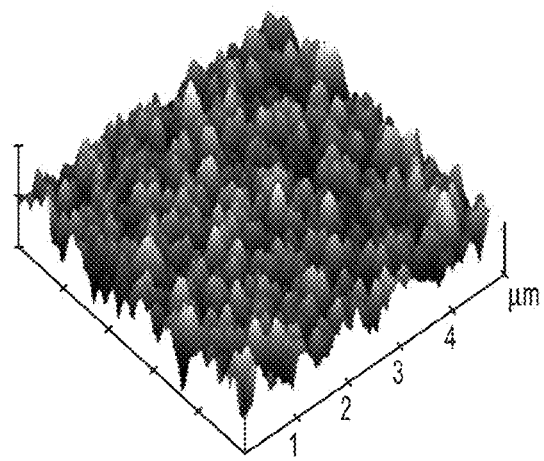
Figure 1C:
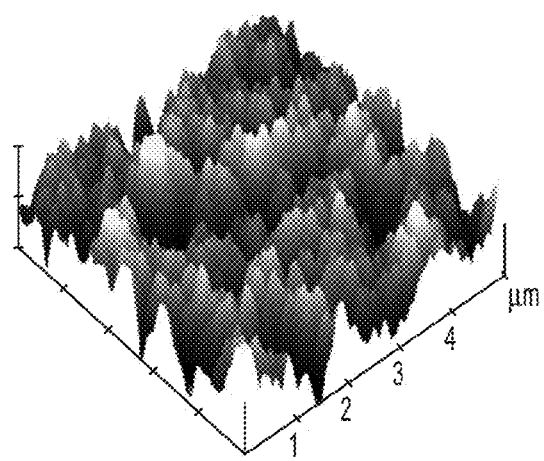

AFM mapping of the tops of the PPX-Cl fibers is shown in FIGS. 1A-C, which provide f values of 0.63, 0.67, and 0.68 for the same films corresponding to predicted $\theta_w$ values of 109.5, 107.4, and 106.3° from Eq. (2), respectively, that again differ markedly from measured $\theta_w$ values. These results suggest that van der Waals and/or capillary forces sufficient to induce wetting behavior associated with the intermediate state are present for the structured PPX-Cl films.

Figure 2A:
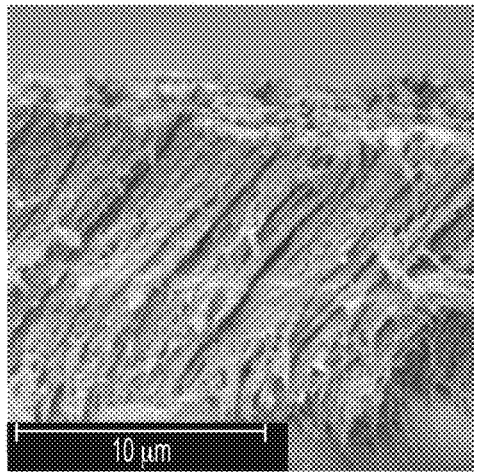
FIG. 2A shows a cross-sectional SEM image of the structured PPX-COCF$_3$ film. Shapes of water droplets on the structured PPX-COCF$_3$ film with different tilt angles.
Figure 2B:
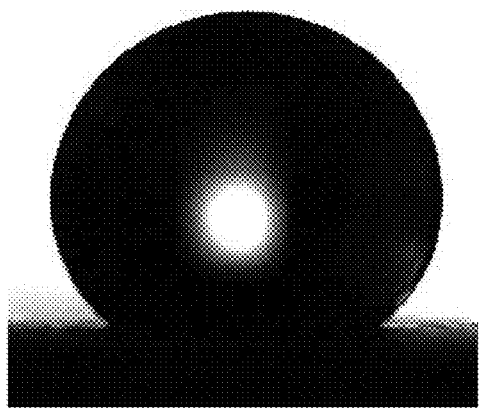
FIG. 2B: 0°.
Figure 2C:
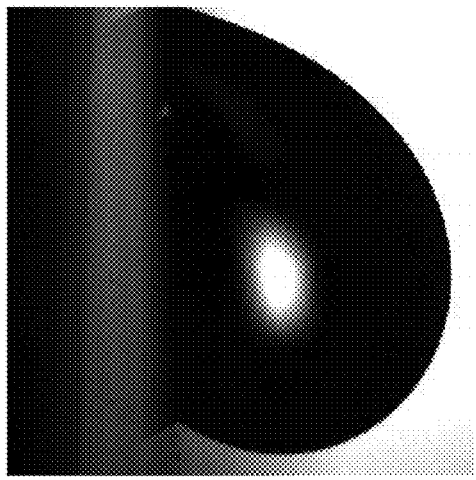
FIG. 2C: 90°, and FIG. 2D 180°.
Figure 2D:
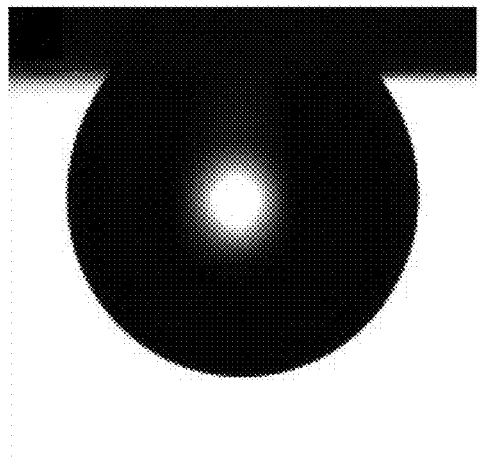

Changes in the chemical composition of the PPX film associated with the use of [2.2]paracyclophanes bearing other hydrophobic substituents, such as the trifluoroacetyl group, also produce nanostructured films capable of exhibiting this intermediate wetting state. For example, FIG. 2A shows a cross-sectional scanning electron microscope (SEM) image of a structured poly(trifluoroacetyl-p-xylylene) ($PPX-COCF_3$) film deposited using the trifluoroacetyl-di-p-xylylene precursor on a silicon substrate. Very clearly, the SEM images confirm that the structured $PPX-COCF_3$ film consists of assemblies of parallel columns. The inclination angle of the columns is 61°. Although the structured $PPX-COCF_3$ film morphology, as indicated by the diameter of its pillars, is similar to that of the PPX-Cl film (Table 1), it is more hydrophobic ($\theta_w = 135.7°$; Table 1 and FIG. 2B) than the PPX-Cl film ($\theta_w = 119.3°$, Table 1). However, good adhesion of the water droplet placed on the surface is observed for both films. For example, even when the films were tilted vertically or flipped upside down, as shown in FIGS. 2C, D, respectively, for the PPX-COCF$_3$ film, the water droplet did not slide from the surface. However, the planar PPX-COCF$_3$ film has a static contact angle of 88° (Table 1), and the roll-off angle is 25°. The structured PPX-COCF$_3$ film is composed of approximately ~10$^7$ aligned columns (approximately 120-170 nm in diameter) per square millimeter. Clearly, both increased surface hydrophobicity and adhesion are due to nanostructure.

TABLE 1

Static Contact Angle Measurements for PPX Films

| Substrate Type | Planar (deg) | Structured (deg) | average column size (nm) |
|---|---|---|---|
| PPX-COCF$_3$ | 88 ± 3 | 135.7 ± 4.0 | 160 ± 7 |
| PPX-Cl | 87 ± 2 | 119.3 ± 1.2 | 140 ± 11 |
| PPX-Br | 80 ± 2 | 115.2 ± 1.4 | 188 ± 10 |

Similar adhesive behavior is also noted for structured poly-(bromo-p-xylylene) (PPX-Br) films prepared by the oblique deposition of the dibromo-di-p-xylylene precursor at the α=10° incident angle geometry used for the PPX-Cl and PPX-COCF$_3$ films, even though the (~188±10)-nm-diameter PPX-Br columns are somewhat larger than those of the other films. Table 1 summarizes the wettability behavior and structural features (i.e., average column diameters) observed for each film.

Clearly, high surface adhesion is observed even for PPX films having diverse chemical compositions. The hydrophobic natures of the planar as well as structured forms of the PPX-derivative films are exemplified by the contact-angle goniometry results, which range from 80° to ~136° depending on the type of film. In general, every planar film is less hydrophobic than its structured counterparts as a result of the roughness differences; the structured PPX films are very rough compared to the planar PPX films. This is expected because planar films form a conformal surface, and their surface roughness is very small. Additionally, structured PPX-COCF$_3$ exhibits superior hydrophobicity compared to the remaining five films as a result of the CF$_3$ group in the polymer and the surface roughness associated with the film's nanostructure. It is noteworthy that all three structured PPX surfaces exhibit good adhesive interactions with water droplets. Such behavior suggests that there exists a range of surface energies, as measured by θ$_w$ (~115-136°) and determined by the PPX surface chemical composition and morphology (Table 1), for the fabrication of hydrophobic, adhesive materials of these types.

Direct chemical modification of the native PPX surface represents an additional means to control the hydrophobicity and adhesive properties using the nanostructured PPX films. For example, it is generally known that the chemisorption of fluoroalkyltrichlorosilanes to hydroxyl groups present on appropriately roughened substrate surfaces, such as ZnO, provides a convenient means to fabricate superhydrophobic surfaces (Li et al., *Nanotechnology* 2006, 17, 238-243; Li et al., *J. Colloid Interface Sci.* 2005, 287, 634-639). Superhydrophobic surfaces satisfy two important criteria. They exhibit (1) very high θ$_w$ values (>150°) and (2) very low water droplet roll-off angles (<5°).

Figure 3A:
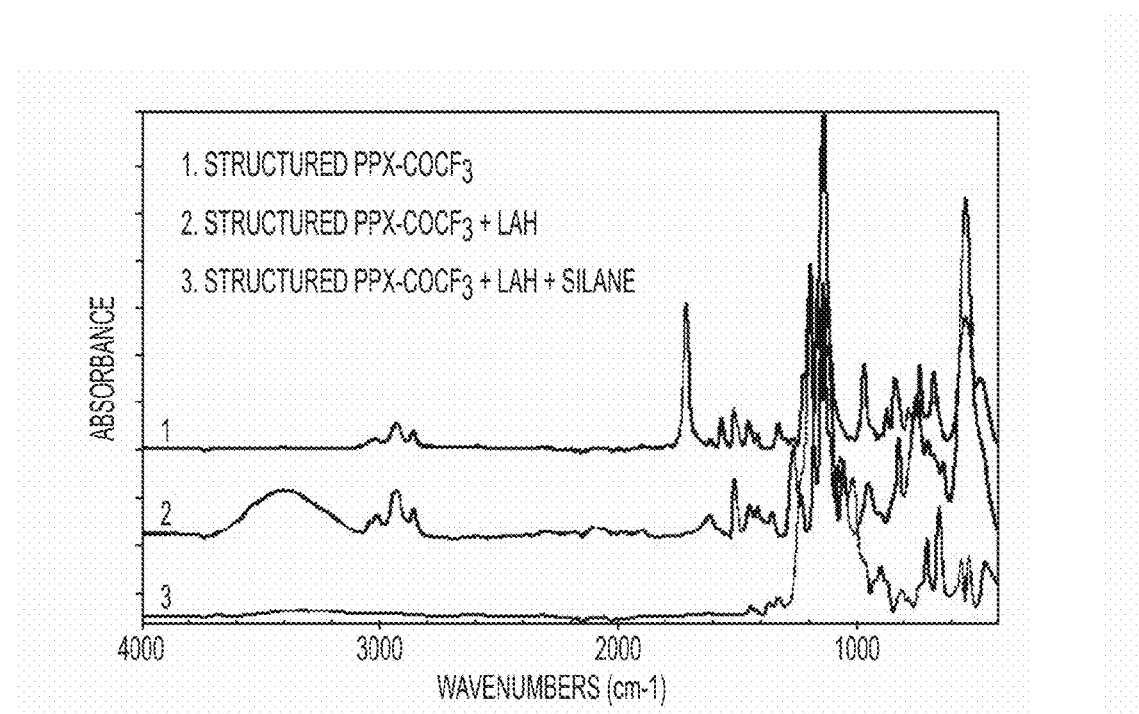
FIG. 3A shows FTIR/ATR spectra of the structured PPX-COCF$_3$ film are shown for three conditions: (1) before lithium aluminum hydride (LAH) reduction, (2) after LAH reduction, and (3) after 3 h of fluoroalkyltrichlorosilane chemisorption.

The surface of the nanostructured PPX-COCF$_3$ film may be reacted with lithium aluminum hydride (LAH) (or other suitable reducing agent) in THF to reduce the carbonyl group to a secondary alcohol. After the reduction, θ$_w$ of the film, referred to hereafter as PPX-COHCF$_3$, was measured to be 78°, which is consistent with the replacement of the ketone by a more hydrophilic hydroxyl group. The IR spectra of the films shown in FIG. 3A confirmed the reduction of the ketone to the alcohol. The ketone peak of the untreated PPX-COCF$_3$ film observed at 1712 cm$^{-1}$ (spectrum 1) disappeared, and an OH band at 3500 cm$^{-1}$ (spectrum 2) ascribed to the secondary hydroxyl group appeared after the LAH treatment. The chemistry of the surface layer(s) of the nanostructured PPX-COCF$_3$ film of formula (1) is thereby altered to that of a PPX-COHCF$_3$ species of formula (2) after the LAH treatment.

A chemically reactive group, designated R$^2$, can be reacted with the OH group of the PPX-COHCF$_3$ formed on the outer layer(s) of the nanostructured PPX-COCF$_3$ film to chemisorb said R$^2$ group to said OH sites of the PPX-COHCF$_3$. Such a modified PPX-COHCF$_3$ has the structure shown in formula (5). Formulas (6)-(10) show various chemisorbed groups made by reacting the PPX-COHCF$_3$ with a precursor of a chemisorbed group.

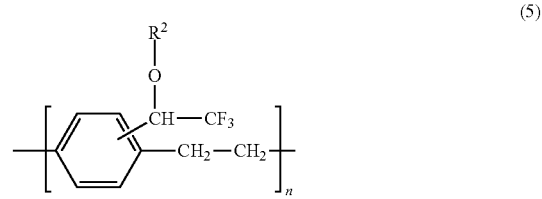

(5)

Formula (6) shows the product of reaction with a fluoroalkyltrichlorosilane, where R$^3$ is a fluorinated alkyl group and m is a positive integer. The R$^3$SiCl$_3$ groups hydrolyze due to trace water in the air and on the PPX surface (water associated with the OH groups made from the LAH reaction) to form R$^3$Si(OH)$_3$ groups plus HCl gas. These OH groups then condense with themselves or the PPX surface OH groups via elimination of water to form the Si—O—C and Si—O—Si bonds. Thus, at least some, though not necessarily all of the silicon atoms are incorporated in to a polysiloxane. Suitable fluoroalkyltrichlorosilanes include, but are not limited to, those having a C$_6$-C$_{15}$ alkyl group substituted with from 0 to 17 fluorine atoms and heptadecafluoro-1,1,2,2-tetrahydrodecyltrichlorosilane. The hydroxyl sites created by the reduction of surface ketone groups of the structured PPX-COCF$_3$ films by LAH react readily with hexane solutions of heptadecafluoro-1,1,2,2-tetrahydrodecyltrichlorosilane to conformally chemisorb this organotrichlorosilane onto the polymer surface.

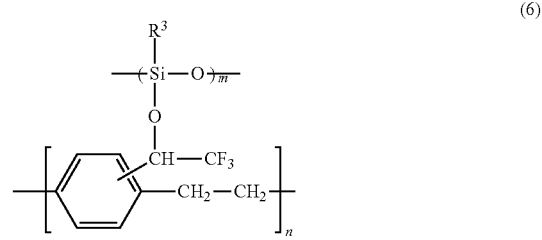

(6)

Formula (7) shows the product of reaction with trimethoxyallylsilane, which is similar to the above reaction. Formula (8) shows the copolymerization product of formula (7) with N-isopropylacrylamide. The structure represents a random copolymer with m and p being positive integers.

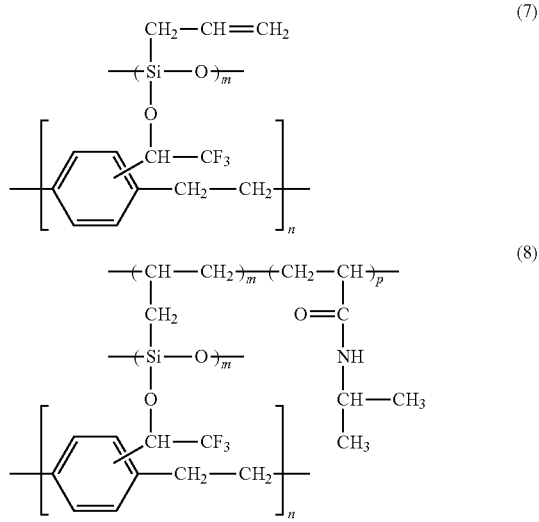

(7)

(8)

Formula (9) shows the product of reaction with a polyisocyanate. $R^4$ is an organic group. Formula (10) shows the subsequent reaction with a polyethylene glycol (PEG), where p is a positive integer. While this formula shows linear PEG, a branched PEG may also be used. A suitable diisocyanate is hexamethylene diisocyanate (HMDI).

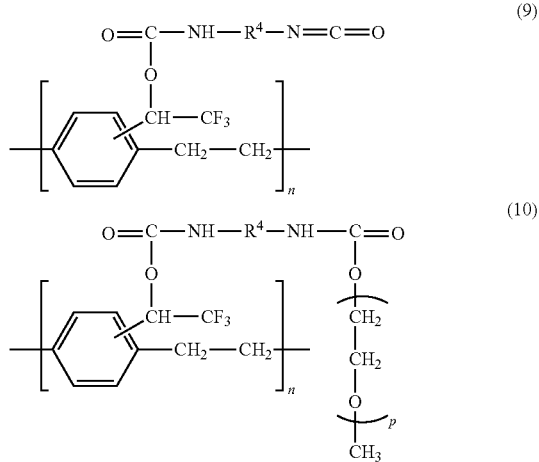

(9)

(10)

Other suitable $R^1$ groups can contain an a carboxyl group or an amine group. In general, all these polymers may be nanostructured films made by: converting a di-p-xylylene paracyclophane dimer to a reactive vapor of monomers, the reactive vapor having a flux; depositing the reactive vapor under vacuum onto a substrate held fixed in a specific angle of orientation relative to the vapor flux to form nanostructured poly(p-xylylene) film; reacting the nanostructured poly(p-xylylene) film with an agent to form hydrogen atoms attached to the poly(p-xylylene) film that are reactive with a precursor of the chemisorbed group, if the deposited film does not contain the hydrogen atoms; and reacting the hydrogen atoms with the precursor of the chemisorbed group. The film may have nanocolumns, nanohelices, and/or nanochevrons as described in U.S. Patent Application Publication No. 2007/0148206. The nanocolumns may be separated by channels that are about 10 to about 30 nm wide.

The nature of the fluoroalkylsiloxane films formed during the chemisorption process is known to depend upon the amount of water present on the substrate surface, with multilayer film deposition favored for chemisorption onto highly hydrated surfaces (Tripp et al., *Langmuir* 1993, 9, 3518-3522). Chemisorption can be confirmed by (1) the appearance of a Si 2p signal at 102.7±0.2 eV associated with the presence of siloxane species (Dressick et al., *Jpn. J. Appl. Phys., Part* 1 1993, 32, 5829-5839) in the XPS spectrum of the treated surface (FIG. 5) and (2) the disappearance of the hydroxyl IR band at 3500 cm$^{-1}$, as shown in spectrum 3 of FIG. 3A. The good wettability (i.e., $\theta_w=78°$) measured for the PPX-COHCF$_3$ films disclosed here suggests a well-hydrated surface, which may be responsible for the formation of a fluoroalkylsiloxane multilayer in this system.

Figure 3B:
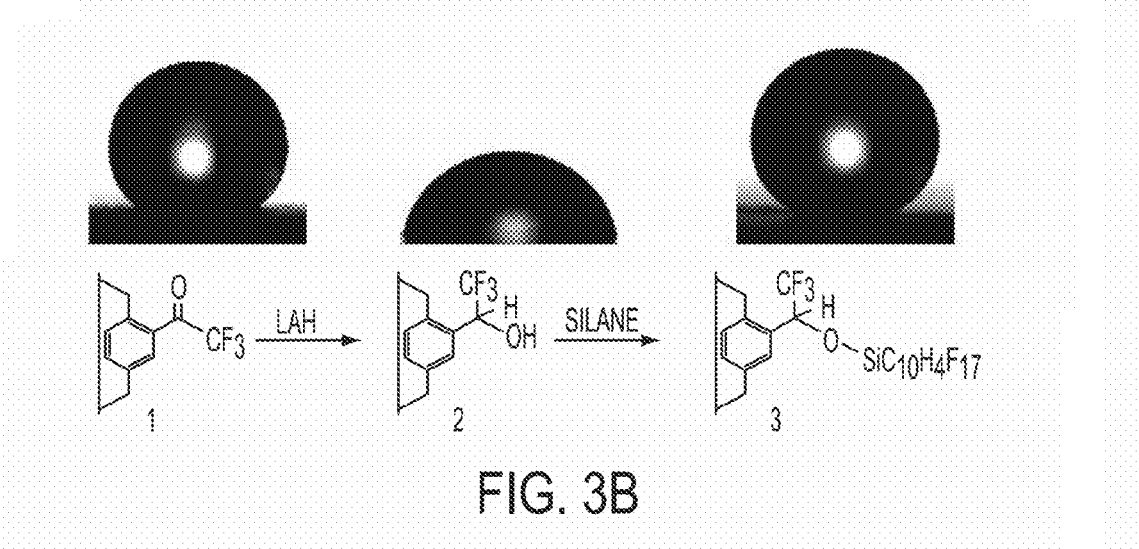
FIG. 3B shows that water droplets adhere well to the surface for conditions 1 and 2 but become nonadherent (roll-off angle <5°) for condition 3. The contact angles for conditions 1-3 are 136°, 78°, and 152°, respectively. (2) The disappearance of the hydroxyl IR band at 3500 cm$^{-3}$, as shown in spectrum 3 of FIG. 3A.

The maximum contact angle for a heptadecafluoro-1,1,2,2-tetrahydrodecylsiloxane self-assembled monolayer (SAM) film is reported to be 110° on a planar silicon substrate (Sugimura et al., *J. Vac. Sci. Technol. B* 2002, 20, 393-395). After the chemisorption of a heptadecafluoro-1,1,2,2-tetrahydrodecylsiloxane film onto the nanostructured PPX-COHCF$_3$ film, the contact angle is measured to be 152° (FIG. 3B). Repetition of the heptadecafluoro-1,1,2,2-tetrahydrodecylsiloxane chemisorption experiment in triplicate for various treatment times (i.e., 1, 3, and 24 h) provides films having $\theta_w$ values of 104, 152, and 150°, respectively. The heptadecafluoro-1,1,2,2-tetrahydrodecylsiloxane-coated nanostructured PPX-COHCF$_3$ film clearly becomes superhydrophobic ($\theta_w=152°$; i.e., a 42° increase in $\theta_w$ compared to that of the corresponding heptadecafluoro-1,1,2,2-tetrahydrodecylsiloxane SAM on a planar Si surface) after just ~3 h treatment.

In contrast to the behavior of the nanostructured PPX-COCF$_3$ film prior to and after LAH treatment, however, water droplets do not adhere (roll-off angle ~3°) to the heptadecafluoro-1,1,2,2-tetrahydrodecylsiloxane-coated nanostructured PPX-COHCF$_3$ film. The penetration of the water droplet into the interstitial regions between the nanocolumns required to access the intermediate wetting state associated with adhesive behavior is clearly hindered for this film. Although the low surface energies associated with the CF$_2$ and CF$_3$ functional groups present at the outer heptadecafluoro-1,1,2,2-tetrahydrodecylsiloxane layer certainly contribute to the water repellency, geometric factors may also be involved. Specifically, in previous studies it was shown that columnar spacings within nanostructured PPX films can be as small as ~10-30 nm, especially for thicker films (i.e., micrometer scale) such as those used here (Demirel et al., *Advanced Materials*, 19 (24) 4495-4499 (2007)). At such small dimensions, the chemisorption of a multilayer film of several nanometers thickness may also contribute to the exclusion of water through narrowing of the channels separating the nanocolumns. The fact that adherent properties have been previously observed for other poorly wetted (i.e., $\theta_w>150°$) surfaces indicates that superhydrophobicity alone is not a sufficient barrier to adhesive behavior and that geometric or other factors specific to our nanostructured PPX films contribute.

The experiments disclosed herein indicate that adhesive behavior can readily be observed for nanostructured PPX films having higher surface energies (i.e., lower $\theta_w$) than those shown in Table 1. For example, the PPX-COHCF$_3$ film exhibits a relatively high surface energy, as indicated by its low $\theta_w=78°$, compared to the materials in Table 1. Unlike the superhydrophobic fluoroalkylsiloxane-coated nanostructured PPX-COHCF$_3$ film, however, this film exhibits adhesive behavior similar to that observed for the other nanostructured PPX films described in Table 1 and FIG. 2A. Consequently, adhesive behavior for these nanostructured PPX films can be observed over an extremely wide range of surface energies, presently represented by $\theta_w$=78°-136°. It is interesting that each of these materials possess heteroatom components capable of exhibiting dipolar (e.g., PPX-Cl, PPX-Br, or PPX-COCF$_3$) or hydrogen bonding (e.g., PPX-COHCF$_3$) interactions with water, which are features that may be necessary to promote the intermediate wetting state associated with the adhesive function.

Poly(chloro-p-xylylene) (PPX-Cl) was also selected for thin-film deposition. Physical and chemical properties of PPX-Cl films (i.e., crystallinity, structure, surface energy, and surface topography) were qualitatively assessed by scanning electron microscopy (SEM), atomic force microscopy (AFM), glancing angle X-ray diffraction (XRD), contact angle measurements, and infrared (IR) spectrophotometry.

Figure 4A:
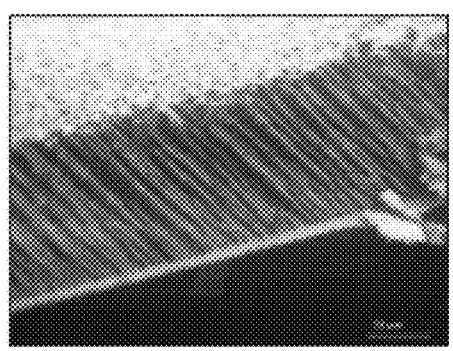
FIG. 4A shows a cross-section SEM image and a top-surface AFM image of a nanostructured PPX-Cl thin film fabricated by deposition for 10 min on a silicon substrate.
Figure 4B:
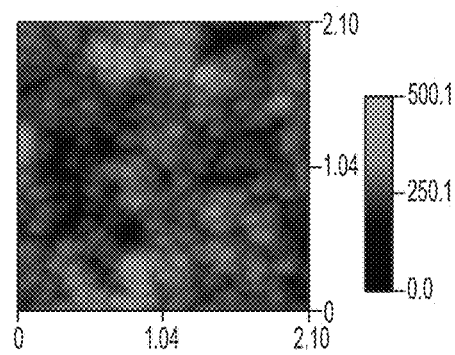
FIG. 4B shows a top-surface AFM image of the same film showing nanowires that are approximately 50-100 nm in diameter (scale shows the height).

Very clearly, the SEM image (FIG. 4A) confirms that nanostructured PPX-Cl thin films are assemblies of parallel, slanted, free-standing columns. Furthermore, the AFM image (FIG. 4B) shows that the columns are assemblies of nanowires that are 50 to 100 nm in diameter. Thus, the nanostructured PPX-Cl thin films contain nanowires having an aspect ratio (i.e., length/diameter) as high as 1000:1.

Figure 4C:
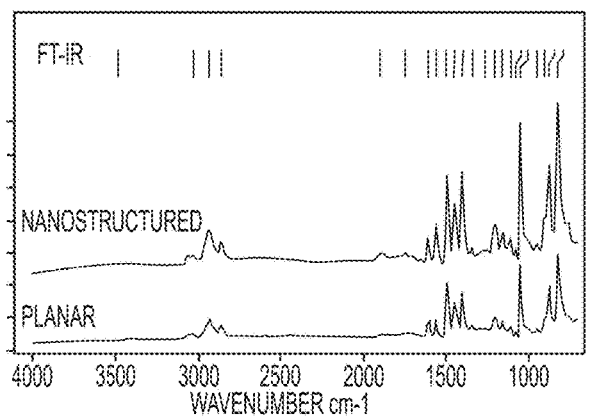
FIG. 4C shows a transmission IR spectra of a nanostructured PPX-Cl thin film and a planar PPX-Cl thin film.

Transmission infrared (IR) spectroscopy was used to compare the nanostructured PPX-Cl thin films qualitatively with planar PPX thin films (which are conventionally deposited and do not possess nanostructured morphology). The IR analysis over the 500 to 4000 cm$^{-1}$ frequency range shows features for CH stretching (2800-3000 cm$^{-1}$), aromatic CH stretching (3026 cm$^{-1}$), CH deformation (1340 cm$^{-1}$), C deformation (1401 cm$^{-1}$), and benzene breathing (950 cm$^{-1}$) in FIG. 4C for both nanostructured and planar PPX-Cl thin films. This indicates that the chemical structure of the nanostructured PPX-Cl thin films is the same as that of the planar counterparts.

Figure 4D:
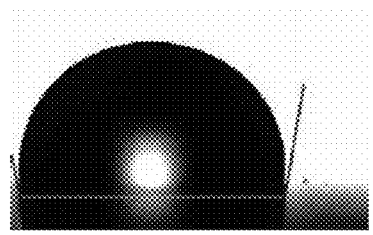
FIG. 4D shows an optical image of a water drop on the top surface of a nanostructured PPX-Cl thin film, the apparent contact angle being 100°.

The hydrophobic nature of the nanostructured PPX-Cl thin films is shown by the optical image in FIG. 4D of a water drop on the top surface of a film. The shape of the water drop on the resulting surface has an apparent contact angle of 100±5°, according to a standard static contact-angle measurement system. The surface roughness and porosity of nanostructured PPX-Cl film were measured with an AFM to be 60 nm and 50%, respectively. Hence, the contact angle for the nanostructured PPX-Cl thin film is predicted by the Wenzel formula to be 94°, which is slightly higher than the 87° value measured for the planar PPX-Cl thin film.

Figure 4E:
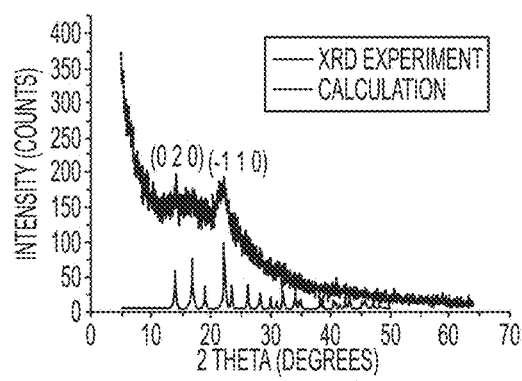
FIG. 4E shows measured and calculated diffraction patterns of a nanostructured PPX-Cl thin film.
Figure 4F:
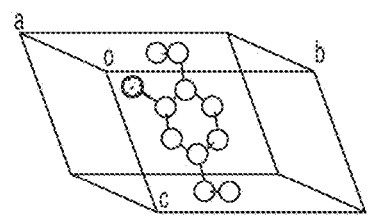
FIG. 4F shows crystal structure of PPX-Cl, wherein hydrogen atoms are not shown for clarity and the first and last carbon atoms in the crystal lattice represent the repeat unit along the polymer chain (carbon and chlorine shown in gray and black respectively).

The semicrystalline behavior of polymers is of great importance to the physical and chemical properties exhibited by the material. Planar PPX-Cl thin films produced conventionally are typically only about 50-60% crystalline. At temperatures below the melting point of the crystallites, the planar PPX-Cl thin films cannot be dissolved, but a slight swelling is observed as the solvent attacks the amorphous phase: 0% for water and 1 to 3% for dichlorobenzene. The measured X-ray diffraction (XRD) pattern in FIG. 4E shows that nanostructured PPX-Cl thin films are also semi-crystalline. The diffraction pattern of PPX-Cl was also calculated using Mercury software based on a monoclinic unit cell (FIG. 4F) with $\alpha$=596 pm, b=1269 pm, c (chain axis)=666 pm, and $\beta$=135.2°. A chloro-substituted ring represents the repeat unit along the polymer chain. Two major peaks, (020) and (−110), are identified from the XRD data based on the computed diffraction pattern.

The disclosed films may have the combined properties of a water-droplet contact angle of greater than about 150 degrees and a water-droplet roll-off angle of about 3 degrees or less, or a water-droplet contact angle of greater than about 70 degrees and a water-droplet roll-off angle of greater than about 10 degrees. The film may also have directional hydrophobic or oleophobic properties and directional adhesive properties. This means that a drop placed on the film may exhibit different contact angles around the circumference, and will roll off at different tilt angles depending on the direction of the tilt. This can occur when the nanostructures at the surface of the film are anisotropic as with nanochevrons or tilted nanocolumns. For example, it may be more difficult for a drop to run off against the grain of tilted columns.

The anisotropic effects may be exploited in such a film on a pivotable substrate. The pivot point may be a hinge or other connector that attaches the substrate to another member, which may be stationary or movable. The device may be used by tilting the substrate at an angle at which the film will adhere a droplet of a predetermined liquid; dipping the film into a container of the liquid; positioning the substrate over a receptacle; and tilting the substrate at an angle at which the film does not adhere the droplet. Such a device may be used for moving drops of liquid that comprises one more microbial pathogens or droplets of radioactive liquids in a shielded environment where people cannot be exposed to the radiation.

Figure 6:
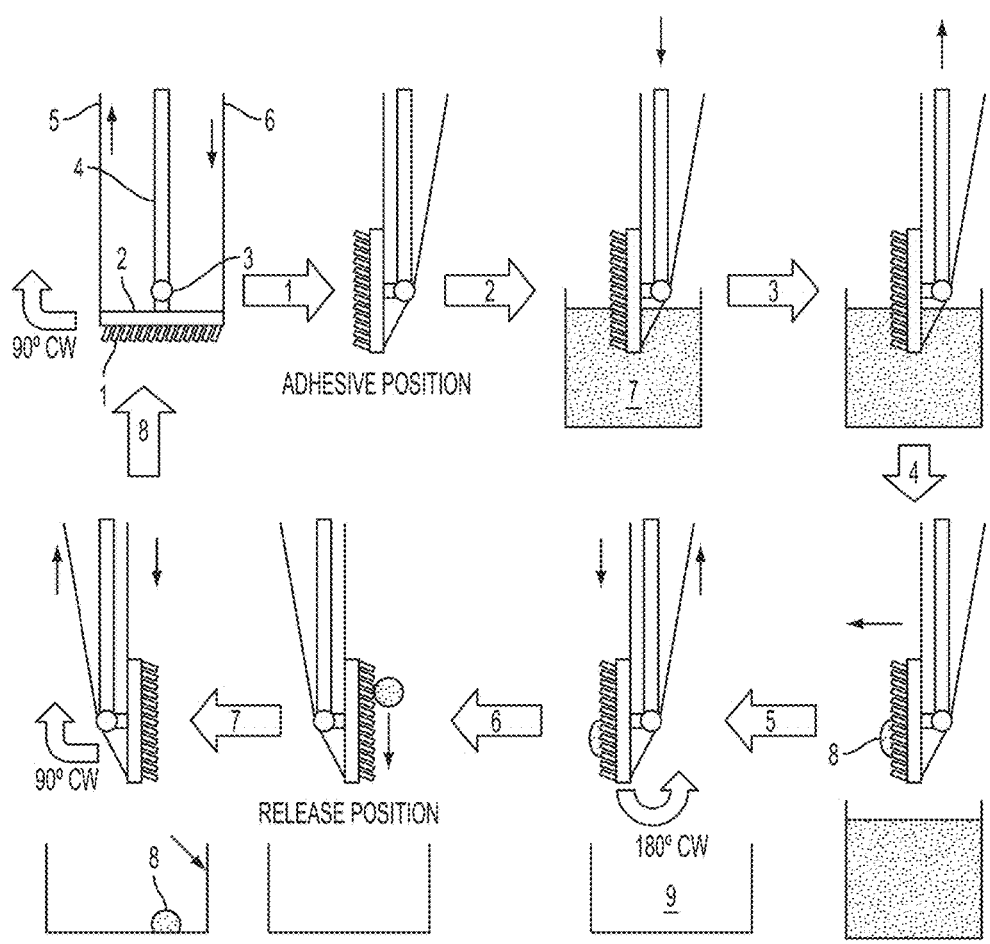
FIG. 6 shows an embodiment of a device for moving drops of a liquid.

An embodiment of such a device is shown in FIG. 6 as a robotic arm. During use, tension is placed on control wire 5 and relaxed on control wire 6 to rotate the nanostructured parylene film 1 9° clockwise in step 1 to the liquid droplet adhesive position. The robot arm 4 is moved above a container of liquid 7 and then lowered to contact the nanostructured parylene film 1 with liquid 7 in step 2. The arm 4 is then raised vertically to remove the nanostructured parylene film 1 from liquid 7 in step 3, adhering a liquid droplet 8 of liquid 7 to the nanostructured parylene film 1 in step 4. The robot arm 4, with nanostructured parylene film 1 locked in the adhesive position and bearing an adhered droplet 8 of liquid 7 is moved in step 5 above a different container 9 designed to receive droplet 8. Tension is placed on control wire 6 and relaxed on control wire 5 to rotate the nanostructured parylene film 1 180° counterclockwise from the liquid droplet adhesive position to the liquid droplet release position in step 6. Droplet 8 of liquid 7 is thereby immediately released from the nanostructured parylene film 1 and falls by gravity into container 9 in step 7. Tension is then placed on control wire 5 and relaxed on control wire 6 to rotate the nanostructured parylene film 90° clockwise to return said nanostructured parylene film 1 in step 8 to its starting position.

It has been demonstrated that both the hydrophobicity and adhesion of model nanostructured PPX films can be readily varied through control of the film morphology (roughness) as well as the surface chemistry via PPX chemical composition or direct chemical modification of the PPX film surface. The columnar components of the nanostructured PPX films constitute a carpet of densely packed fibers (i.e., 140-200 nm diameter; ~(2-3)×10$^7$ columns mm$^{-2}$) reminiscent of the naturally occurring adhesive keratinous fibers of a gecko's foot (~5×10$^5$ fibers on each foot). The nanocolumnar morphology of our PPX films promotes strong adhesive interactions with water droplets over a wide range of surface compositions, chemistries, and energies, as measured by $\theta_w$ values ranging from 78 to 136°. Further attempts to reduce wettability via chemisorption of fluoroalkylsiloxane coatings onto nanostructured PPX films produce "truly" superhydrophobic materials exhibiting both poor wettability (i.e., $\theta_w=152°$) and poor water droplet adhesion (water drop roll-off angle <3°) under these conditions. Nevertheless, the ability to control both hydrophobicity and adhesion using nanostructured PPX films is a promising development because it may lead to a new generation of coatings for applications ranging from self-cleaning surfaces and biomedical implants to robotics.

The following examples are given to illustrate specific applications. These specific examples are not intended to limit the scope of the disclosure in this application.

EXAMPLE 1

Characterization Methods—

Transmission infrared spectra (IR, Bruker) were collected with respect to a silicon wafer reference in air. Spectra were recorded using Norton-Beer apodization with 1 $cm^{-1}$ resolution, and for each spectrum, 400 scans were coadded. The spectra were analyzed using OPUS 5.5 software. The surface roughness was quantified by AFM (Nanoscope E, Veeco) in a liquid chamber using silicon nitride cantilevers in contact mode. Column dimensions were calculated with Nanoscope software (Veeco Metrology, CA) using the grain size tool. Contact angle measurements (DFTA 1000, First Ten Angstroms, Inc.) were carried out with a video microscope interfaced to a computer. The glancing angle XRD pattern of a nanostructured PPXC thin film deposited on a glass substrate was measured (Scintag Pad V). Samples for scanning electron microscopy (JEOL 6700F FE-SEM) images were prepared by cleaving the thin films in liquid nitrogen.

The film roughness of the nanostructured PPX films can be tailored by varying the thickness of film. Surface area and roughness of each sample were calculated with the Nanoscope Software (Veeco Metrology, CA). In general, the nanostructured PPX films were 30% rougher compared to the planar PPX films. This is expected since planar films form a conformal surface and their surface roughness is very small. The contact angle measurement is performed using a standard water drop test. FIG. 4D shows that the film become more hydrophobic as the surface roughness of nanostructured PPX increases.

Contact angles for the films ranged from 80° to 135° depending on the type of film. In general, every planar film was less hydrophobic than its nanostructured counterparts, because the contact angle for the former is less than for the latter. Nanostructured PPX-F exhibited superior hydrophobicity compared to the remaining five types of films. All surface measurements were performed with a Nanoscope-E atomic force microscope (Veeco Metrology, CA). Topography images were collected in ambient air at room temperature, with silicon nitride (SiN) triangular cantilevers having contact mode tips (DNT-20, Veeco Metrology, CA). Static contact angles were measured by applying a video microscope interfaced to a computer (FTA-I 000).

EXAMPLE 2

PPX Film Deposition—

The paracyclophane precursor for the poly(chloro-p-xylylene) (PPX-Cl) films, dichloro-di-p-xylylene, was obtained from Uniglobe-Kisco Inc. The precursors for the poly-(bromo-p-xylylene) (PPX-Br) film, dibromo-di-p-xylylene, and poly(trifluoroacetyl-p-xylylene) (PPX-COCF$_3$) film, trifluoroacetyl-di-p-xylylene, were prepared according to the literature method (Cetinkaya et al., Polymer 2007, 48, 4130-4134). The nanocolumnar PPX films used here were prepared using an $\alpha=10°$ deposition angle.

EXAMPLE 3

Film Characterization—

Static contact angles were measured by applying a video microscope interfaced to a computer (FTA-1000) to capture drop images. Deionized $H_2O$ (10 μL, 18 MΩ-cm resistivity; Barnstead Nanopure II deionizer) was used for contact angle measurements. Surface roughness was measured with a Nanoscope-E atomic force microscope (Veeco Metrology, CA) in ambient air at room temperature, with silicon nitride (SiN) triangular cantilevers having contact mode tips (DNP-20, Veeco Metrology, CA). The rms roughness from 5 μm scans (average of three sets) was calculated using the Nanoscope software without tip deconvolution methods as a result of high roughness. Scanning electron microscope (SEM) images were recorded with a Philips XL-40 system after cleaving the samples in liquid nitrogen. The FTIR (Thermo Nicolet IR) and ATR (diamond crystal) data were collected with respect to silicon wafer reference in air and were recorded using Norton-Beer apodization with 4 $cm^{-1}$ resolution. For each spectrum, 100 scans were co-added.

EXAMPLE 4

PPX-COCF$_3$ Film Reduction by LiAH$_4$—

Experiments were done in a glove bag in a dry $N_2$ atmosphere. All chemicals were used without further purification. LiAlH$_4$ (LAH) was purchased from Alfa Aesar. In a typical experiment, 50 mg of LAH was dissolved in ~25 mL of THF (Aldrich Sure-Seal, <0.005% $H_2O$) in a dry 50 mL round-bottomed flask, and the PPX-COCF$_3$ film was immersed in this solution for 4 h. The treated PPX-COCF$_3$ film, designated PPX-COHCF$_3$, was removed from the flask, rinsed with fresh THF, removed from the glove bag, and examined by IR. Upon completion of the reaction, the IR absorption band of the ketone group at 1712 $cm^{-1}$ disappeared. The reduced PPX-COHCF$_3$ film was then thoroughly rinsed with water (doubly distilled) and dried under vacuum overnight.

EXAMPLE 5

Silane Functionalization—

Heptadecafluoro-1,1,2,2-tetrahydrodecyltrichlorosilane (Gelest, PA) was reacted with the PPX-COHCF$_3$ film in the glove bag under dry $N_2$. A 1% (w/v) solution (10 mL) of the organotrichlorosilane was prepared in hexane. The PPX-COHCF$_3$ film was immersed in this solution and kept there for 1, 3, or 24 h. Upon completion of the reaction, the film was removed from the organotrichlorosilane solution, washed with hexane, and dried under vacuum overnight.

Obviously, many modifications and variations are possible in light of the above teachings. It is therefore to be understood that the claimed subject matter may be practiced otherwise than as specifically described. Any reference to claim elements in the singular, e.g., using the articles "a," "an," "the," or "said" is not construed as limiting the element to the singular.

What is claimed is:

1. A method comprising:
   converting a di-p-xylylene paracyclophane dimer to a reactive vapor of monomers, the reactive vapor having a flux;

depositing the reactive vapor under vacuum onto a substrate held fixed in a specific angle of orientation relative to the vapor flux to form nanostructured poly(p-xylylene) film;

reacting the nanostructured poly(p-xylylene) film with an agent to form hydrogen atoms attached to the poly(p-xylylene) film that are reactive with a precursor of a chemisorbed group, if the deposited film does not contain the hydrogen atoms; and reacting the hydrogen atoms with the precursor of the chemisorbed group.

2. The method of claim 1;

wherein the di-p-xylylene paracyclophane dimer is trifluoroacetyl-di-p-xylylene paracyclophane dimer;

wherein the agent is lithium aluminum hydride; and wherein reacting with lithium aluminum hydride produces —CHOH—$CF_3$ groups.

3. The method of claim 2, wherein the precursor is a fluoroalkyltrichlorosilane.

4. The method of claim 3, wherein the fluoroalkyltrichlorosilane is heptadecafluoro-1,1,2,2-tetrahydrodecyltrichlorosilane.

5. The method of claim 2, wherein the precursor is trimethoxyallylsilane.

6. The method of claim 5, further comprising:

copolymerizing the product of the poly(p-xylylene) film-trimethoxyallylsilane reaction with N-isopropylacrylamide.

7. The method of claim 2, wherein the precursor is a polyisocyanate.

8. The method of claim 7, further comprising:

reacting the product of the poly(p-xylylene) film-polyisocyanate reaction with a polyethylene glycol.

* * * * *